United States Patent [19]

Hieb

[11] 4,181,074

[45] Jan. 1, 1980

[54] ROTISSERIE AND BRAZIER

[76] Inventor: Arthur J. Hieb, 501 18th St., Rupert, Id. 83350

[*] Notice: The portion of the term of this patent subsequent to Oct. 1, 1995 has been disclaimed.

[21] Appl. No.: 699,220

[22] Filed: Jul. 23, 1976

[51] Int. Cl.² ............................................. A47J 37/04
[52] U.S. Cl. ....................... 99/421 HH; 99/421 HV; 99/446
[58] Field of Search ............ 99/421 H, 421 HH, 446, 99/419, 357, 421 HV

[56] References Cited

U.S. PATENT DOCUMENTS

| | | | |
|---|---|---|---|
| 2,512,223 | 6/1950 | Contiguglia | 99/421 HH |
| 2,715,870 | 8/1955 | Rutkowski | 99/446 |
| 2,815,707 | 12/1957 | Morrow | 99/421 HH |
| 3,286,620 | 11/1966 | Brown | 99/446 |
| 3,324,788 | 6/1967 | LaFrance | 99/446 |
| 3,812,776 | 5/1974 | Kean | 99/421 H |

FOREIGN PATENT DOCUMENTS 908646 10/1962 United Kingdom ............... 99/421 H

Primary Examiner—George F. Mautz

[57] ABSTRACT

The rotisserie and brazier comprises a cabinet being closed on its side walls and top and having a pair of doors hingedly mounted on its fowardmost terminal side, a firebox being a trough-like member being coextensive in width and mounted at the lower rearward portion of the cabinet, a grease trough being mounted parallelly adjacent the firebox in the lower forward portion of the cabinet, and a suitably driven rotisserie shaft being journally mounted in the cabinet wherein one of the journals is detachably secured and the opposing journal is hingedly secured to the rotisserie shaft to permit the rotisserie shaft to be pivoted out of the cabinet. The rotisserie and brazier may be further provided with an improved holding basket for retaining meat on the rotisserie spit, and various devices for adjusting the firebox with respect to the meat. The rotisserie and brazier may also be provided with a transporting carriage assembly to permit towing by a motor vehicle.

5 Claims, 7 Drawing Figures

ROTISSERIE AND BRAZIER

FIELD OF THE INVENTION

The present invention relates to braziers and more particularly to rotisseries and braziers constructions for large pieces of meat.

BACKGROUND OF THE INVENTION:

Barbequing of large pieces of meat such as half or whole carcasses of beef, lamb or port has involved certain long felt notorious problems. Among these is how to efficiently provide sufficient heat to roast the meat while permitting the chef easy access to the meat for doing the various cooking steps. Furthermore, with extremely large pieces it is important that the large qualities of drippings which include fat and water do not drip directly into the fire lest flairups and excessive smoke damage the meat and inconvenience guests. Finally, where rotisseries and braziers have been offered over the ancient fire pit, such rotisseries and braziers have been of such construction as to be cumbersome and inconvenient to transport.

Accordingly, it is an object to the present invention to provide a rotisserie and brazier wherein an integrated structure having an adjustable firebox is provided in combination with means for carrying away drippings from meat.

It is a further object of this invention that the carcass be carried on a spit which holds the meat on the spit even where the meat has become extremely well done. It is a corollary object of this invention that the aforesaid spit also have means for rotating the spit away from the firebox to permit the chef to perform the various cooking steps with ease and convenience.

It is still another object of this invention that the present brazier be easily and conveniently transportable.

These and other objects shall become apparent from the description following, it being understood that modifications may be made without affecting the teachings of the invention here set out.

SUMMARY OF THE INVENTION

The rotisserie and brazier comprises a cabinet being closed on its side walls and top and having a pair of doors hingedly mounted on its forwardmost terminal side, a firebox being a trough-like member being coextensive in width with and mounted at the lower rearward portion of the cabinet, a grease trough being mounted parallelly adjacent the firebox in the lower forward portion of the cabinet, and a suitably driven rotisserie shaft being journally mounted in the cabinet wherein one of the journals is detachably secured and the opposing journal is hingedly secured to the rotisserie shaft to permit the rotisserie shaft to be pivoted out of the cabinet. The rotisserie and brazier may be further provided with an improved holding basket for retaining meat on a the rotisserie spit, and various devices for adjusting the firebox with respect to the meat. The rotisserie and brazier may also be provided with a transporting carriage assembly to permit towing by a motor vehicle.

A more thorough and comprehensive understanding may be had from the detailed description of the preferred embodiment when read in connection with the drawings forming a part of this specification.

DETAILED DESCRIPTION OF THE PREFERRED EMBODIMENT

Figure 1:
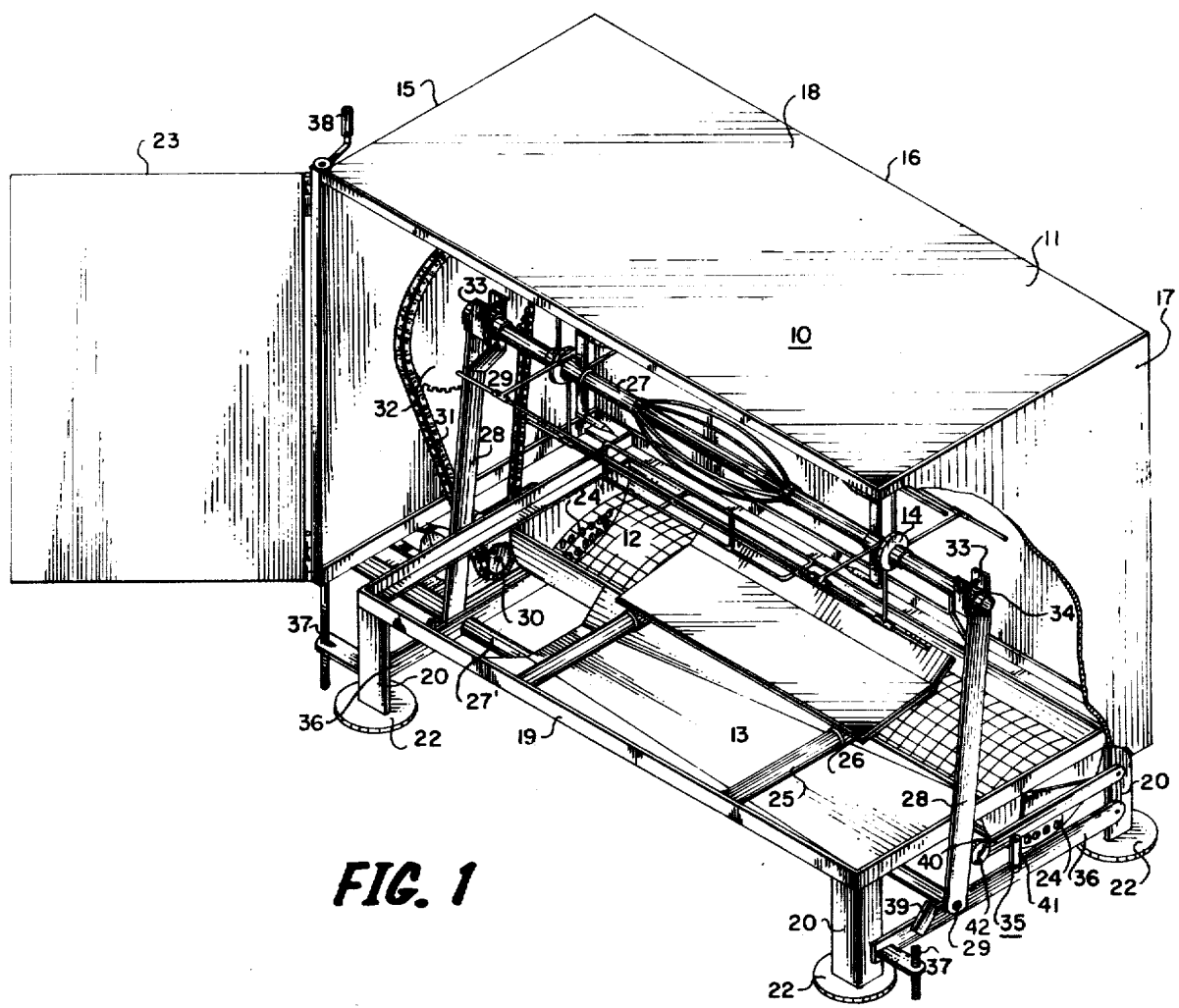
FIG. 1 is a left-front perspective view of the rotisserie and brazier of this invention.

Referring now to the drawings and more particularly to the FIG. 1, the rotisserie and brazier of this invention is shown to advantage and generally identified by the numeral 10. The rotisserie 10 is particularly well adapted to barbequing large pieces of meat such as half or whole carcasses of beef, lamb or port, and the like. Although the present brazier is so described herein, it is understood that various other sizes may be employed with similar advantages.

The rotisserie 10 comprises a cabinet 11, a firebox 12, a grease trough 13, and rotisserie assembly 14. The cabinet 11 is a rectangular enclosure having closed side walls 15, 16, and 17, and top wall 18. The cabinet 11 is supported by a rectangular frame 19 which includes a plurality of legs 20 having foot pads 22. The front side of the cabinet 11 is provided with a pair of hingedly mounted doors 23. As shown in the FIG. 1, the bottom of the cabinet 11 is open to permit protrustion of the various actuators herein, and to permit free circulation of air and gases through the rotisserie 10.

The firebox 12 is coextensive in length with the rearward wall of the cabinet 11, and is mounted in the lower rearward section of the cabinet frame 19. The firebox 12 is a concavely curved, trough-like structure being enclosed at its terminal ends by end walls perforated with multiplicity of holes 24. A screen 24' which may be convexly curved, as seen from above, is placed within the firebox 12 to permit circulation of air under burning coals which are placed therein. The firebox 12 is adjustably carried in the cabinet 11 as shall be described hereinafter.

Figure 2:
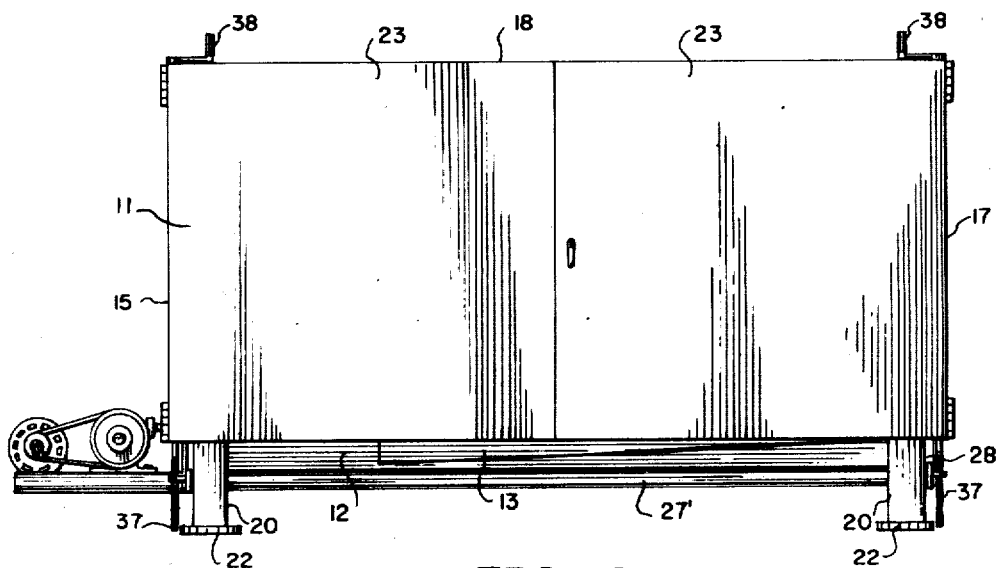
FIG. 2 is a right-front perspective view of the dripping trough employed herein.

Referring now to the FIGS. 1 and 2, the grease trough 13 like the firebox 12, is a trough-like member mounted at the forward portion of the cabinet 11, adjacent the firebox 12. The grease trough 13 may be fabricated of sheet material having upwardly inclined sides, each of the sides having a triangular configuration suitable to project the bottom of the trough 13 at an incline to evacuate grease, which may drip thereon. As shown in the FIG. 1, the trough 13 is less than coextensive with the firebox 12 and the cabinet 11. The grease trough 13 is mounted between one of the terminal end walls of the cabinet 11 to appoint distally from the end wall opposite with the lowest point of the trough 13 being disposed at the opening between the terminal end of trough 13 and the end wall of the cabinet 11. A container (not shown) may be placed at this lower end to collect grease. The grease trough 13 may be demountably secured by rods 25 disposed through the frame 19 and through tubes 26 fastened transversely to the lowermost terminal side of the grease trough 13.

Referring again to the FIG. 1, the rotisserie assembly 14 comprises a shaft 27 mounted horizontally and longitudinally in the cabinet 11. Upstanding posts 28, are pivotally mounted at their lowermost terminal ends on pivots 29, which are mounted on the frame 19. The shaft 27 is provided on one of its terminal ends with a sprocket 32, which is driven by a chain 31 connected to a second sprocket 30, which is driven by a prime mover such as a motor (not shown). Shaft 27 is journally mounted in the post 28, and is provided with means for detachably removing one of the terminal ends of the shaft 27 from one of the posts 28, while pivoting on the opposing post 28. This may be accomplished by providing the uppermost terminal end of one of the posts 28 with a yoke 23, which may craddle the terminal end of the shaft 27, and thus, provide both support and bearing means. Means providing the aforesaid pivot of the shaft 27 may be provided by a second yoke 33 which cradles the adjacent terminal end of the shaft 27, and which is itself carried on a pivot which permits articulation along the vertical axis of the post 28. The yoke 33 may carry a bearing 34 to facilitate rotation of the shaft 27 therein. It may be seen that the yoke 33 permits the terminal end of the shaft 27 adjacent the yoke 33 to be released while supporting the shaft 31 in a horizontal position. The chain 27 permits the mechanical means driving the shaft 27 to articulate with respect to the sprocket 32.

Figure 3:
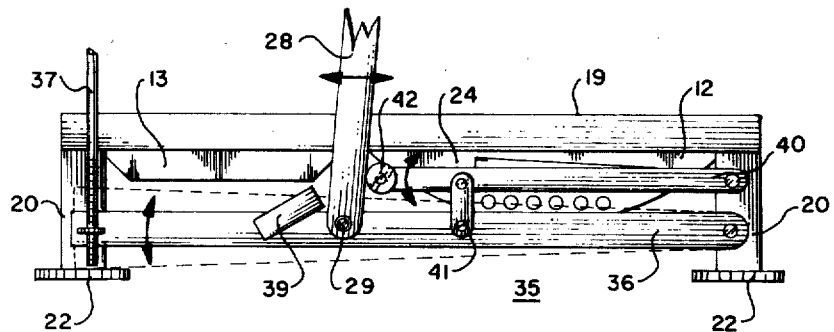
FIG. 3 is a fragmentary side-elevational view of a fire box adjusting assembly.

The posts 28 are pivotally mounted at the forward portions of each of the ends of the frame 19 to carry meat on the shaft 27 in general superimposed registry with the grease trough 13. The rotisserie 10 is provided with means for adjusting the orientation of the firebox with respect to the meat and for changing the distance between the meat and the firebox 12. That is, with the configuration of the firebox 12 being substantially parabolic, it is important that the general line of radiation from the firebox 12 be focused at the shaft 27 for each of several distances between the two, which correspond to cooking heats. This adjusting function is accomplished by an adjusting assembly 35 shown in FIG. 3.

The assembly 35 includes a pair of main arms 36 which are pivotally mounted at the lower rearward pair of legs 20. The lowermost terminal end of the posts 28 are pivotally mounted midway in the arms 36. The forwardmost terminal ends of the arms 36 are mounted to a pair of adjusting screws 37, which are mounted vertically in the cabinet 11, and may include crank handles 38. Each of the arms 36 includes a stop 39 disposed distally forward of the pivot of the posts 28, which are operable to restrict forward travel of the posts 28 to facilitate handling during loading of the shaft 27. A guide arm 40 is employed to control rearward travel of the posts 28, and to control the orientation and height of the firebox 12. Each guide on 40 is pivoted at its rearwardmost terminal end on the rearward leg 20 over the arm 36. The forwardmost portion of the arm 40 is carried by a linkage 41, which is pivotally mounted between the forward portion of the arm 40, and a corresponding portion of the arm 36. The forwardmost terminal end of the guide arm 40 is provided with a journalled roller 42, which contacts the rearward edge of each post 28. The firebox 12 is pivotally mounted at its rearwardmost terminal end to an adjacent portion of the frame 19. The forward portion of the firebox 12 is supported by a stud 43 which rests on the uppermost terminal edge of the respective arms 40. In operation, as the screw 37 actuates the forwardmost terminal end of the arm 36 downwardly with the post 28 resting adjacent the roller 42, the shaft 27 moves rearwardly and downwardly into the cabinet 11. Simultaneously, the forward edge of the firebox 12 moves downwardly with the radiation therefrom being focussed more directly on the meat. Conversely, as the screw 27 actuates the forward end of the arm 36 upwardly, the post 28 is driven to a more vertical position, and the firebox 12 into a more horizontal orientation, with a coresponding decrease in cooking temperature.

Figure 4:
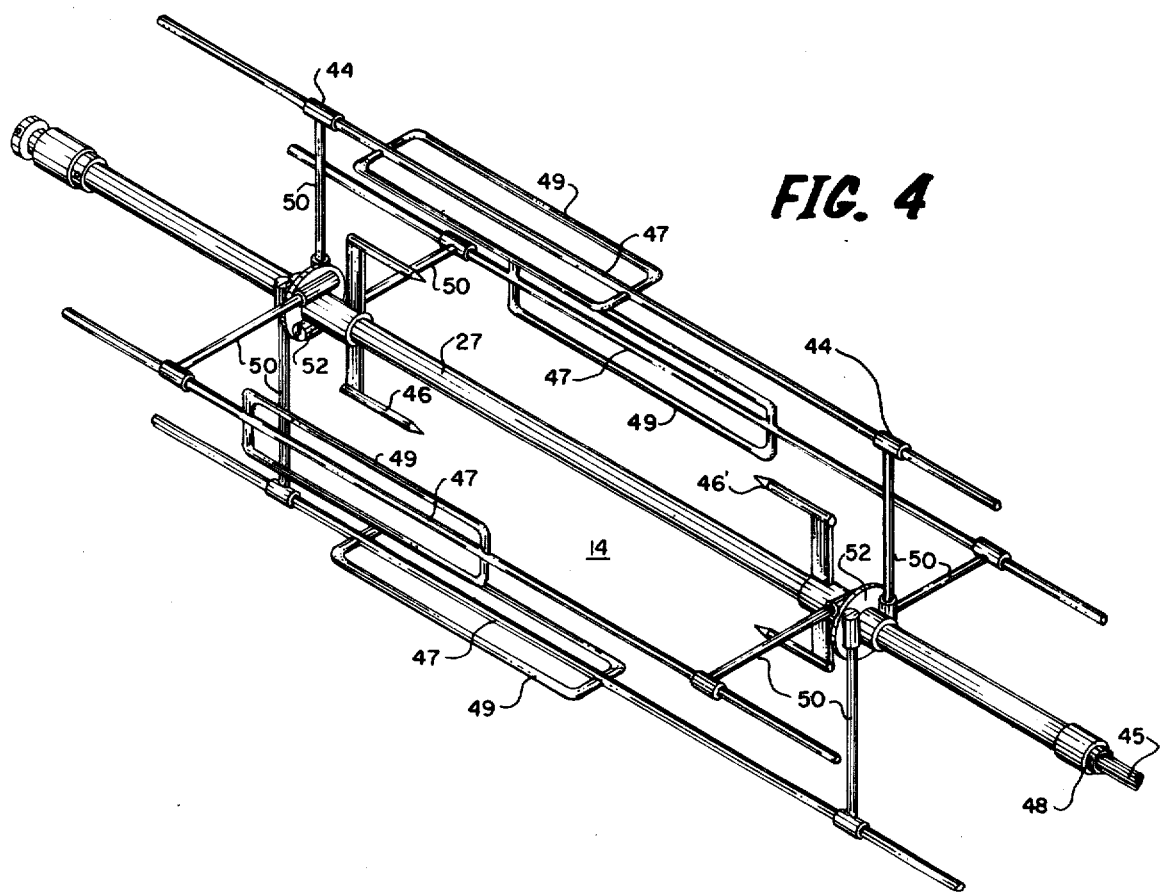
FIG. 4 is a perspective view of the rotisserie spit employed herein.

The assembly 14 is intended to carry any of a number of rotisserie spits and meat carriers. It has been found of particular advantage in the prime application of the present rotisserie 10 to provide a spit which may both pierce and support the meat section at several points. As shown in the FIG. 4, a spit 44 of particular advantage comprises a tube 45, spit forks 46, and meat supports 47. The shaft 45 is carried on the shaft 27, and is secured by means such as a lock screw 48. The forks 46 are carried at interior points on the shaft 45, and each includes a pair of interiorly opposed tines 46', which penetrate and secure the meat. The meat supporting members 47 are provided to carry extreme and shifting loads of the meat on the tines 46. Each of the members 47 comprises webs 49 which issue radially from the shaft 45 connecting rods 50 which are connected to the outer terminal ends of each of the radially paired webs 49, to be carried parallelly to the shaft 45; and meat engaging pads 51 which are mounted centrally in the rods 49. Each of the members 47 may be detachably mounted to the shaft 47 and secured once the meat is installed onto the forks 46. It has been found to particular advantage to carry forks 46 and the webs 49 on a pair of flanges 52 which are slidably engaged onto the shaft 45, and secured thereto. The meat is installed onto the spit 44 by engaging the meat section onto one of the forks 46, and then sliding the opposing fork 46 onto the shaft 45, and then into the meat. The supports 47 are then securely engaged about the aforesides of the meat section.

Figure 5:
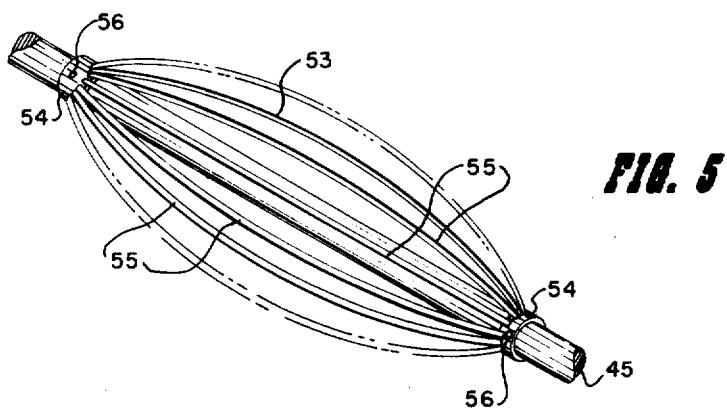
FIG. 5 is a perspective view of the meat enclosing cage employed in combination with the spit of the FIG. 4.

Referring to the FIG. 5, it has been found that in extended cooking of rotisserie meats that shreads of meat tend to become loosened and fall from the spit, and must be secured in a cage 53. The cage 53 comprises a pair of sleeves 54 having an interior diameter nominally larger than the outside diameter of the shaft 45, and a multiplicity of wires 55 connected in parallel between the sleeves 54. Each of the sleeves 54 is provided with a locking screw 56. After the meat has been installed onto the spit 44 one sleeve 54 is inserted onto one of the terminal ends of the sleeve 54, is secured onto one of the terminal ends of the shaft 45. The wires 55 are spread apart to permit meat to pass into the cage 53. Finally, the remaining sleeve 54 is engaged onto the opposing terminal end of the shaft 45, and secured.

Figure 6:
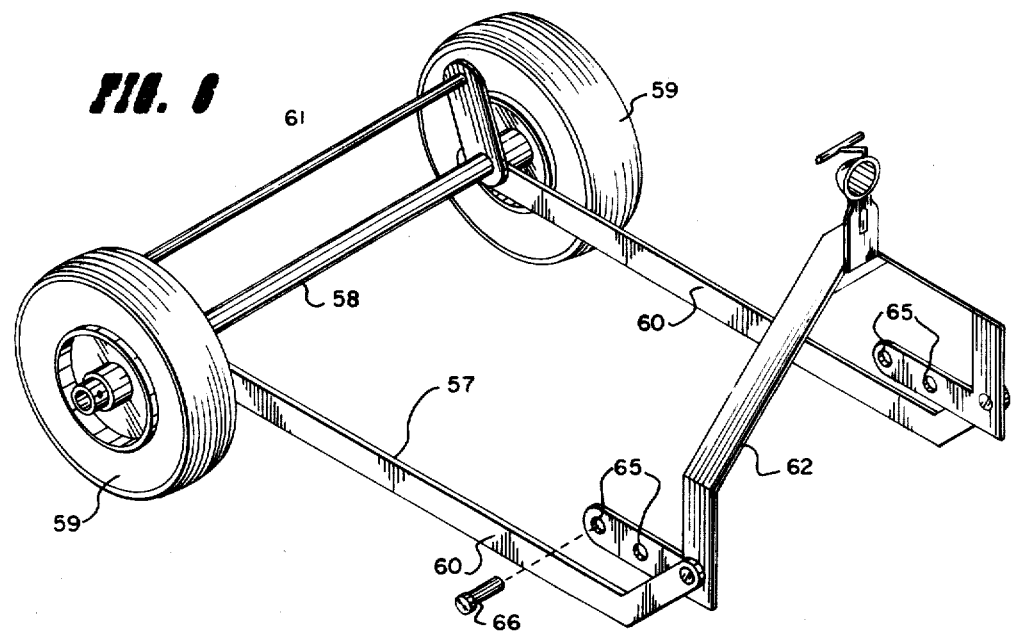
FIG. 6 is a right-front perspective view of the carriage assembly of the present rottisserie and brazier.
Figure 7:
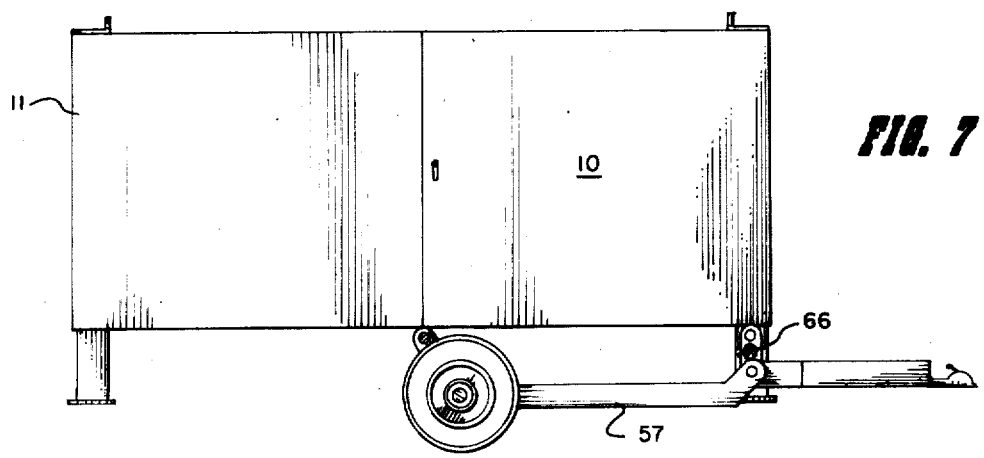
FIG. 7 is a side-elevational view of the rotisserie and brazier mounted on the carriage assembly.

Referring to the FIGS. 6, and 7 the rotisserie 10 may be provided with a carriage to permit towing by an ordinary motor vehicle. The carriage 57 comprises an axle 58, which carries a pair of wheels 59, a pair of parallel disposed carrier bars 60, and a bracket 61 which issues upwardly from the axle 58 to carry the cabinet 11 above the wheels 59. The forwardmost terminal end of the bars 60 are connected to the terminal ends of a substantially V-shaped tongue 62, which is provided at its apex with a hitching coupler 62. It has been found of particular advantage to provide the terminal ends of the tongue 62 with a perpendicularly disposed bracket 64 having a plurality of holes 65 to receive pins 66 securing the cabinet 11.

It may be seen that it is of particular advantage to provide pads 21 with threadable couplings to the legs 20, to permit the footpads to be adjusted downwardly to raise the cabinet 11 off of the carriage 55. The cabinet 11 rests on the carriage 11 at the bracket 61 and 64. The carriage 57 and the cabinet 11 may be secured at the bracket 61 and the bracket 64 by means of detachable pins 66.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. A brazier comprising
    a cabinet having sides, top and rear wall;
    a base frame supporting said cabinet;
    a trough-like firebox extending between said walls and having one side thereof adjacent said rear wall and supported by said frame;
    a grease trough mounted adjacent the other side of said frame;
    a rotisserie shaft supported by said frame and extending above said grease trough;
    means interconnecting said rotisserie shaft and firebox and said frame for simultaneously adjusting the position of said firebox and said rotisserie shaft relative to each other; and
    means for rotating said rotisserie shaft.

2. The brazier of claim 1 further comprising
    hinge means between said rotisserie shaft and said frame for pivoting the entire shaft into and out of said cabinet.

3. The brazier of claim 2 wherein said means for rotating said shaft comprises
    a driven sprocket secured to one end of said shaft;
    a drive sprocket driven by a motor; and
    a chain interconnecting said sprockets, whereby said driven sprocket may be pivoted with said shaft.

4. The brazier of claim 1 further comprising
    bearing means between said frame and said rotisserie shaft for selectively positioning said shaft within said cabinet.

5. The brazier of claim 1 wherein said means for simultaneously adjusting the relative position of said shaft and firebox comprises
    a rotatable rod extending outwardly of said cabinet;
    a linkage interconnecting said firebox, shaft and frame; and
    an arm interconnecting said rod and said linkage whereby rotation of said rod adjusts the position of said shaft and said firebox through said linkage.

* * * * *